(12) United States Patent
Dai et al.

(10) Patent No.: US 9,488,325 B2
(45) Date of Patent: Nov. 8, 2016

(54) LIGHT TRANSMISSION

(71) Applicants: Jianming Dai, San Jose, CA (US); Banghui An, Guangdong (CN)

(72) Inventors: Jianming Dai, San Jose, CA (US); Banghui An, Guangdong (CN)

(73) Assignee: Ming D & Y, British Columbia (CA)

( * ) Notice: Subject to any disclaimer, the term of this patent is extended or adjusted under 35 U.S.C. 154(b) by 0 days.

(21) Appl. No.: 14/544,688

(22) Filed: Feb. 4, 2015

(65) Prior Publication Data

US 2016/0223145 A1  Aug. 4, 2016

(51) Int. Cl.

| *F21V 7/04* | (2006.01) |
| *F21L 4/08* | (2006.01) |
| *F21L 4/02* | (2006.01) |
| *F21V 23/00* | (2015.01) |
| *F21V 23/04* | (2006.01) |
| *F21V 15/01* | (2006.01) |
| *A01K 27/00* | (2006.01) |
| *F21V 1/00* | (2006.01) |
| *F21V 33/00* | (2006.01) |
| *F21V 21/08* | (2006.01) |
| *F21V 8/00* | (2006.01) |
| *F21V 21/32* | (2006.01) |

(52) U.S. Cl.
CPC ............... *F21L 4/08* (2013.01); *A01K 27/006* (2013.01); *F21K 9/61* (2016.08); *F21L 4/02* (2013.01); *F21V 15/01* (2013.01); *F21V 23/005* (2013.01); *F21V 23/0414* (2013.01); *F21L 2001/00* (2013.01); *F21S 4/20* (2016.01); *F21S 4/22* (2016.01); *F21S 4/26* (2016.01); *F21V 21/08* (2013.01); *F21V 21/32* (2013.01); *F21V 33/008* (2013.01); *G02B 6/0096* (2013.01)

(58) Field of Classification Search
CPC .......... A01K 27/006; F21S 4/20; F21S 4/22; F21S 4/26; F21S 48/2237; F21S 48/2268; F21V 33/008; F21V 21/08; F21V 21/32; F21V 2200/15; F21V 220/40; F21V 23/005; G02B 6/0096; G02B 6/0006; G02B 6/001; G02B 27/0994; G02B 6/3826; G02B 6/3827; G02B 6/3829; F21Y 2113/005; F21L 4/08
See application file for complete search history.

(56) References Cited

U.S. PATENT DOCUMENTS 3,935,443 A   1/1976  Simmons
4,173,201 A  11/1979  Chao et al.

(Continued)

FOREIGN PATENT DOCUMENTS

CN   202302948 U   7/2012

OTHER PUBLICATIONS

Prior Public Use device with bistable spring; one page photo.

*Primary Examiner* — Y M Lee

(57) ABSTRACT

A light transmitting device is extremely adaptable and provides a great amount of light for a given battery power. A flexible elongated polymeric light transmitting element has first and second ends with at least one LED immediately adjacent (e. g. touching but not embedded in) one or both of the ends so that light is efficiently transmitted from an LED along the light transmitting element. At least one battery powers the LED. A module including a printed circuit board, electrical switch, and the LED and battery, is positioned within a housing having open ends so that one or both ends of the light transmitting element receive light directly from an LED. A number of button batteries, or a rechargeable battery with USB port, may be mounted on the module, and the circuitry of the printed circuit board may include an integrated circuit.

15 Claims, 5 Drawing Sheets

(56) References Cited

U.S. PATENT DOCUMENTS

| | | |
|---|---|---|
| 4,895,110 A | 1/1990 | LoCascio |
| 4,909,189 A | 3/1990 | Minotti |
| 5,046,456 A | 9/1991 | Heyman et al. |
| 5,370,082 A | 12/1994 | Wade |
| 5,523,927 A | 6/1996 | Gokey |
| 5,879,076 A | 3/1999 | Cross |
| 5,950,571 A | 9/1999 | Schade |
| 6,193,385 B1 | 2/2001 | Maki et al. |
| 6,394,040 B1 | 5/2002 | Axel |
| 7,140,327 B2 | 11/2006 | Morehead |
| 2005/0213343 A1* | 9/2005 | Jablonski ............. A44C 5/0053 362/602 |
| 2006/0109680 A1* | 5/2006 | Peng et al. ................ B62J 6/00 362/582 |
| 2007/0217217 A1* | 9/2007 | Chon .................... F21S 10/005 362/555 |
| 2012/0085298 A1* | 4/2012 | Wolters ................ A01K 27/006 119/859 |
| 2013/0340779 A1* | 12/2013 | Liu ....................... A24F 47/002 131/329 |

* cited by examiner

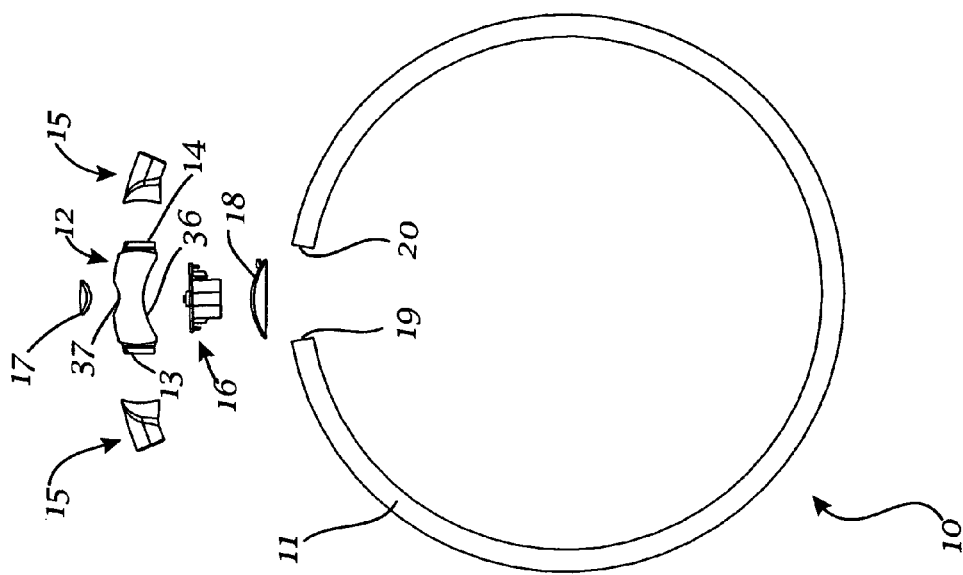
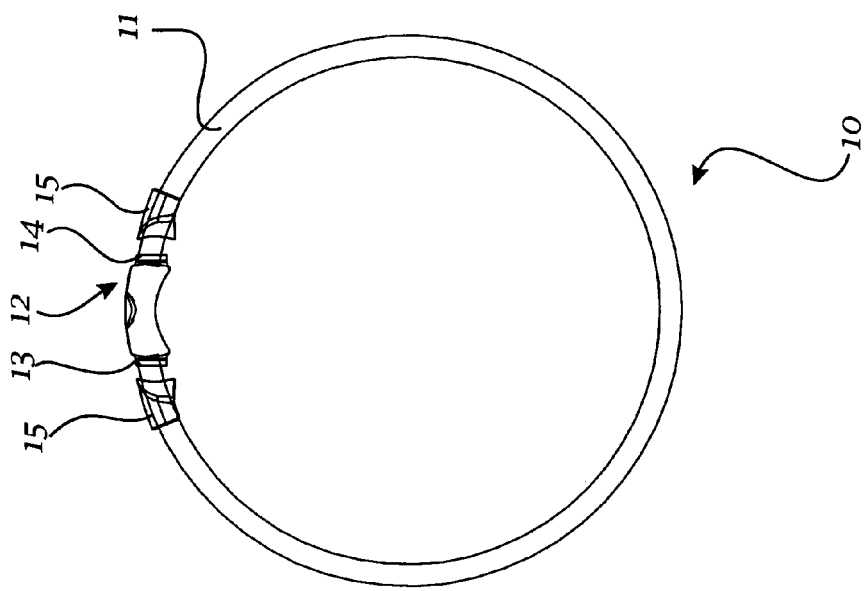

LIGHT TRANSMISSION

BACKGROUND AND SUMMARY OF THE INVENTION

There are many situations where it is desirable to have a highly portable flexible light transmitting device. Some examples of many uses of such devices are: dog collars; safety devices for backpacks, bicycles or clothing; wrist bands or bracelets; toys; and novelty devices including necklaces. While there have been many proposals for such devices in the past, such as shown in U.S. Pat. Nos. 5,046,456, 5,879,076, 6,193,385, and 7,140,327, they do not necessarily have absolutely the best light transmission for a given amount of battery power, nor do they have great adaptability, and they can be relatively expensive.

According to the present invention, a highly adaptable, relatively inexpensive, and efficient, portable flexible light transmitting device is provided. Because of its construction it can have many different lengths using the same light source, its light transmitting properties are excellent, and it can be made relatively inexpensively. The basic elements of the device of the invention that achieve these desirable results are a self-contained LED/battery component, a flexible light transmitting element positioned immediately adjacent but not embedding the LED(s), and an effective way to mount the self-contained LED/battery device and light transmitting element together in an operational relationship.

According to one aspect of the present invention, a light transmitting device is provided which comprises: A flexible elongated light transmitting element having first and second ends (and having a wide variety of cross-sectional configurations including, but not limited to, circular, elliptical and race-track). At least one LED (of virtually any color). At least one battery for powering the LED. And at least one positioning element which positions the LED so that it is immediately adjacent but not embedded in the first end of the light transmitting element so that light is efficiently transmitting from the LED along the light transmitting element. The term "immediately adjacent" in the specification and claims means that an LED is directly aligned with an end of the light transmitting element, is less than two centimeters away from it, and preferably essentially touches it.

The flexible elongated light transmitting element preferably comprises high clarity translucent or transparent thermoplastic polymeric material, such as thermoplastic polyurethane. Desirably the polymeric material is clear, however it can have a tint (e. g. red, blue or yellow) if desired.

The device further preferably comprises a printed circuit board including circuitry which operatively connects the LED to the battery, and an electrical switch in the circuitry which ultimately, through circuitry, connects or disconnects the LED to/from the battery. The printed circuit board mounts the LED, battery, and switch together in an integral module.

Desirably, the positioning element comprises a housing having first and second ends, the housing mounting the module therein and operatively connected at the first and second ends thereof to the first and second ends, respectively, of the light transmitting element (preferably through first and second end caps). The housing may be of hard plastic material, such as ABS, with the first and second housing end caps surrounding the light transmitting element adjacent the first and second ends, respectively, thereof, and operatively engaging the housing at the first and second ends, respectively, thereof. The end caps are preferably of flexible thermoplastic material such as silicone, thermoplastic rubber (TPR), or thermoplastic polyurethane (TPU).

Desirably, the housing has first and second openings formed therein between the first and second ends thereof, the first opening providing for ingress and egress of the module, and the second opening allowing access to the electrical switch for operation thereof. The openings may be covered with flexible material (e. g. TPR) covers.

Preferably the at least one LED comprises first and second LEDs, the first and second LEDs positioned immediately adjacent the first and second ends of the light transmitting element, respectively. In this case the printed circuit board includes circuitry which operatively connects the LEDs to the at least one battery, and an electrical switch in the circuitry which ultimately, through circuitry, connects or disconnects the LEDs to/from the at least one battery.

In one embodiment, the at least one battery comprises a plurality of button batteries mounted face-to-face and engaging at opposite ends thereof metal battery holders also mounted by the printed circuit board. The LEDs are on the opposite sides of the metal battery holders from the button batteries. In another embodiment, the at least one battery comprises a rechargeable battery, in which case the module further comprises a USB port mounted on the printed circuit board which allows recharging of the rechargeable battery.

Desirably, the circuitry includes an integrated circuit having a first terminal connected to the first LED through a resistor, a second terminal connected to the second LED through a resistor, a third terminal connected to the electrical switch, and two other terminals connected to voltage from the at least one battery and ground, respectively, and operatively connected together with a capacitor.

According to another aspect of the present invention a module is provided which comprises: At least one LED. At least one battery. A printed circuit board including circuitry which operatively connects the LED to the battery, and an electrical switch in the circuitry which ultimately, through circuitry, connects or disconnects the LED to/from the battery. The printed circuit board has first and second ends, and mounts the LED, battery, and switch together in an integral module with the LED at the first end thereof.

Preferably the at least one LED comprises first and second LEDs. The first and second LEDs are mounted on the printed circuit board at the first and second ends, respectively, thereof. The at least one battery may comprise a plurality of button batteries, or a rechargeable battery, as discussed above. The circuitry also is preferably as described above.

According to yet another aspect of the present invention there is provided a lighting unit which comprises: A housing of plastic material having first and second open ends. A module comprising first and second LEDs, at least one battery, and an electrical switch for operatively ultimately connecting, through circuitry, the battery to the LEDs. At least a first opening formed in the housing between the first and second open ends thereof, for allowing operative access to at least a part of the module within the housing. And wherein the module is mounted in the housing so that when the LEDs are on they shine light out the first and second open ends, respectively, of the housing.

It is the primary object of the present invention to provide a very adaptable, highly efficient, and relatively inexpensive light transmitting device. This and other objects of the invention will become clear from an inspection of the detailed description, and from the appended claims.

BRIEF DESCRIPTION OF THE DRAWINGS

FIG. 1 is a side view of a substantially assembled light transmitting device according to an exemplary embodiment of the present invention;

FIG. 2 is an exploded view of the device of FIG. 1;

DETAILED DESCRIPTION OF THE DRAWINGS

Figure 3:
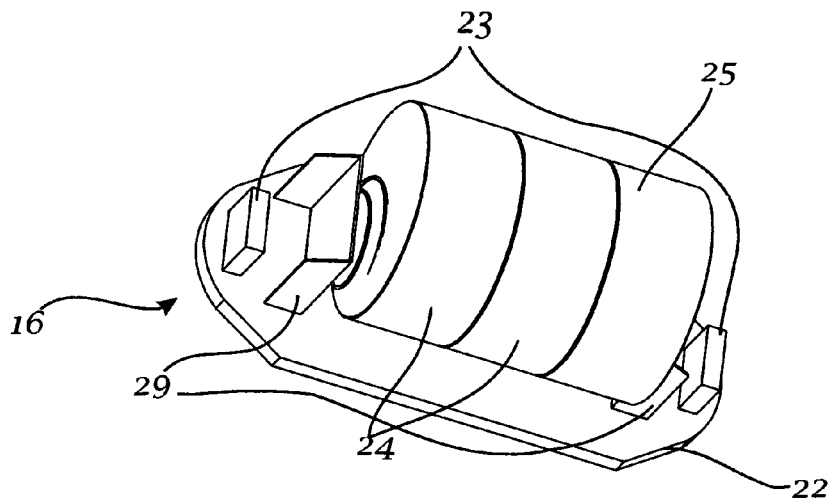
FIG. 3 is a bottom perspective view of a button battery version of an exemplary embodiment of a module according to the present invention.

An exemplary light transmitting device according to the invention is shown generally by reference numeral 10 in FIGS. 1 and 2. The main components of this exemplary embodiment include the light transmitting element 11, a housing 12 having first and second open ends 13, 14, end caps 15 for the housing 12 ends, a module 16 containing electrical components which provide light to be transmitted along element 11, and flexible material covers 17, 18 for openings in the particular housing 12 illustrated in FIGS. 1 and 2. In FIG. 1, all of the components are assembled except that the end caps 15 are shown away from the housing 12, and in FIG. 2 the components are disassembled.

The light transmitting element 11 comprises a flexible elongated light transmitting element having first and second ends, 19, 20 (see FIG. 2), respectively. The element 11 is preferably of a high clarity polymeric material. The preferred material is thermoplastic polyurethane. Some examples of other useable materials are disclosed in U.S. Pat. No. 5,879,076. While the element 11 is preferably of clear polymeric material, it may have a tint (e. g. red, blue or yellow). The element 11 may have a wide variety of cross-sectional configurations including, but not limited to, circular, elliptical, or race-track. As seen in FIGS. 1 and 2 preferably the element 11 has sufficient flexibility to be bent into a circular or collar-like configuration, although if desired only one end 19, 20 may be connected to the housing 12, and the other end may be free or capped.

The module 16 may have a variety of forms. One form—using reference numeral 16—is schematically illustrated in FIGS. 3 & 4, while a second form—using reference numeral 116—is schematically illustrated in FIG. 5.

Figure 4:
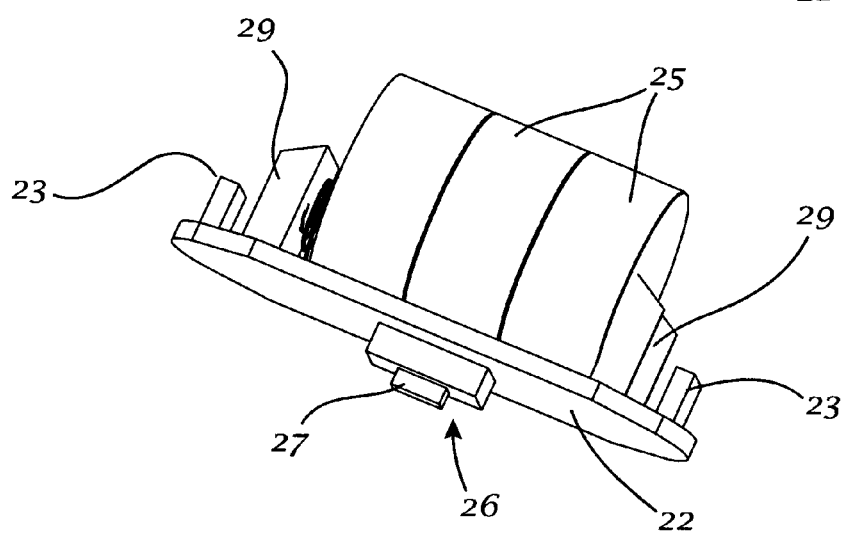
FIG. 4 is a top perspective view of the module of FIG. 3.
Figure 5:
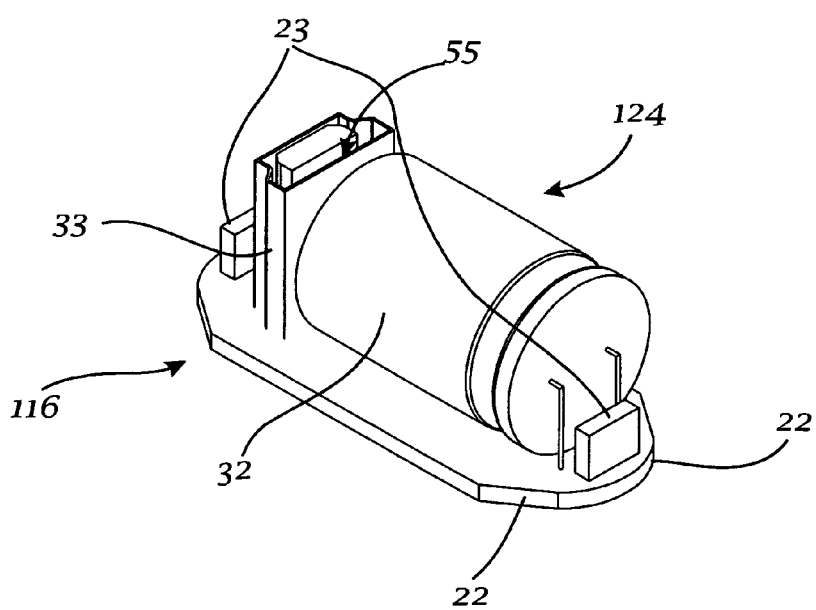
FIG. 5 is a bottom perspective view of a rechargeable battery version of an exemplary embodiment of a module according to the present invention.

As illustrated in FIGS. 3 & 4, the module 16 includes a printed circuit board 22 which mounts at least one LED 23 and at least one battery 24. As illustrated preferably two LEDs 23 (or sets of LEDs) are provided. The LEDs 23 may be of any suitable type or color (e. g. red, yellow, green, orange, pink, white). For example each LED 23 may be a type 3528 SMD LED placed sideways (as illustrated) so that light emanating therefrom passes directly into an end 19, 20 of the element 11. Other types are also suitable such as 5050 SMD 3 mm or 5 mm LEDs.

In the embodiment illustrated in FIGS. 3 & 4, the battery 24 comprises a plurality of conventional button batteries 25, e. g. three 1.5 V or 1.55 V batteries, such as L1154 alkaline batteries, 357 silver oxide batteries, or CR 1220 lithium manganese ones.

The module 16 also includes a conventional electrical switch 26 (FIGS. 4 & 15) which ultimately (e. g. through circuitry to be hereafter described) connects or disconnects the batteries 25 to/from the LEDs 23. The switch 26 may be of any suitable conventional type, such as an alternate action pushbutton switch, which has an actuator 27, or simply a metal dome switch. While it may have only two positions, on or off, desirably an integrated circuit (60 in FIG. 15), or a functionally comparable device, is utilized to provide multiple functions. For example if the switch 26 actuator 27 is pressed a first time only one of the LEDs 23 is energized, when pressed a second time both LEDs 23 are energized, when pressed a third time both of the LEDs 23 flash, and when pressed a fourth time the LEDs 23 are off.

The printed circuit board 22 of module 16 also contains appropriate circuitry for providing suitable operation. One exemplary form of such circuitry is illustrated generally at 28 in FIG. 15, and will be described subsequently.

The module 16 further includes metal battery holders 29 which hold the batteries 25 in place, face-to-face. The LEDs 23 are on the opposite sides of the holders 29 from the batteries 25. While the holders 29 desirably are made of copper plated with nickel, other suitable metals may be utilized.

Figure 15:
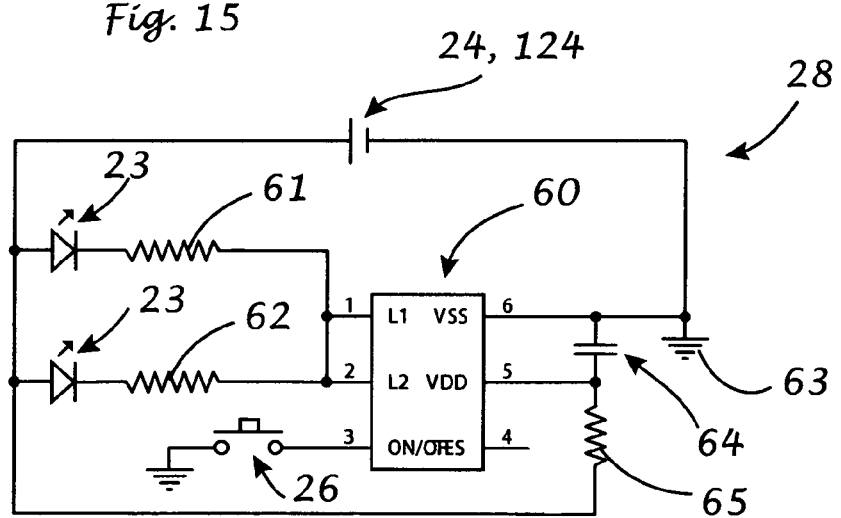
FIG. 15 a circuit diagram of exemplary circuitry associated with the printed circuit board of the modules of FIGS. 3-5.

The module 116 of FIG. 5 is substantially the same as the module 16 except that the battery 124 comprises a single rechargeable battery 32 instead of a plurality of button batteries 25. For example, the battery 32 could be an 80 mAH, 3.7 V, lithium rechargeable battery. In order to provide a mechanism for recharging the battery 32, a conventional USB port 33 or the like is provided. For example, the USB port 33 may be a mini-A type. A switch 26, such as illustrated in FIG. 4, is provided on the opposite side of the printed circuit board 22 of the module 116 from that illustrated in FIG. 5, and circuitry like circuitry 28 in FIG. 15 is also provided in this embodiment.

Figure 6:
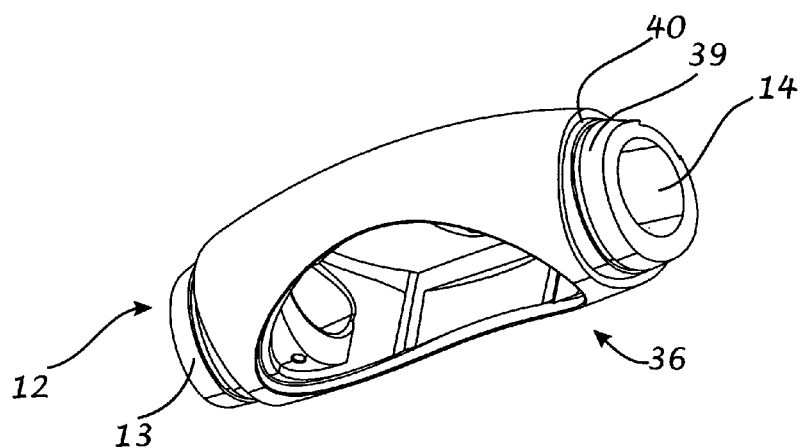
FIG. 6 is a bottom perspective view of an exemplary housing for the module of FIG. 3, 4 or 5.
Figure 7:
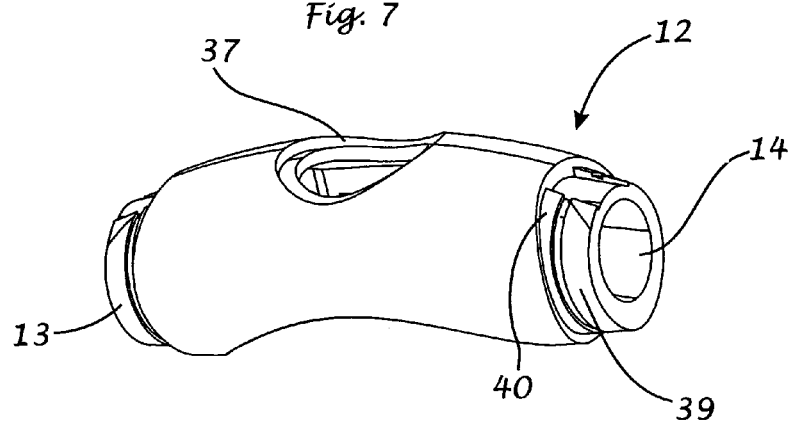
FIG. 7 is a top perspective view of the housing of FIG. 6.

One form of the housing 12, which is suited for mounting either of the modules 16, 116, is illustrated in FIGS. 6 & 7. In this particular embodiment the housing 12 is molded of hard plastic, such as ABS. The ends 19, 20 of the element 11 fit into the openings 13, 14, respectively, of the housing 12. The housing 12 cooperates with the end caps 15 to position the element 11 ends 19, 20 so that at least one of the ends 19, 20 is immediately adjacent an LED 23, but the LED is not embedded in it. As earlier indicated, the term "immediately adjacent" as used in the specification and claims means that an LED 23 is directly aligned with an end 19, 20 of the light transmitting element 11 and is less than about two centimeters away from it, and preferably essentially touches it. This provides the most efficient light transmitting capability.

Since the LEDs 23 are not embedded in the element 11, any length of element 11 may easily be provided for a device 10. There is no concern about exactly where the element 11 may be cut, or any related problems.

As seen in FIGS. 6 & 7, the housing 12 has two openings 36, 37 between the open ends 13, 14 thereof. The opening 36 (FIG. 6) is large enough to allow ingress or egress of the module 16 into or out of the housing 12. This allows access to the batteries 25 so that they can be replaced when they wear out, or can allow the entire module 16 to be removed. The opening 36 is preferably covered by a rigid (although it could be flexible) thermoplastic material removable cover, such as schematically illustrated at 18 in FIG. 2.

Figure 10:
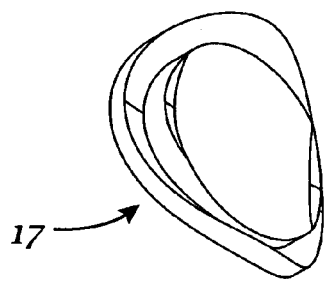
FIG. 10 is a bottom perspective view of an exemplary covering for the switch access opening of the housing of FIGS. 6 & 7.
Figure 11:
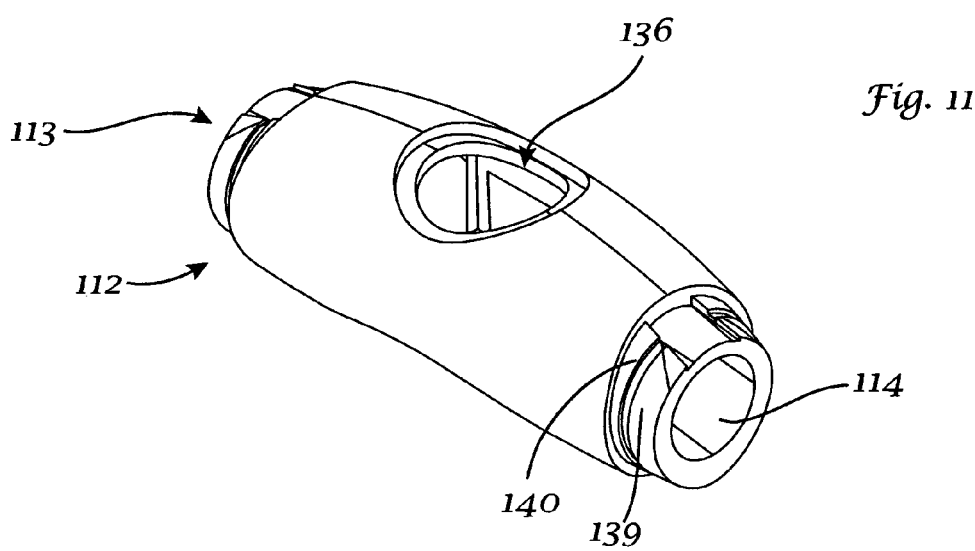
FIGS. 11 & 12 are top and bottom perspective views, respectively, of an exemplary housing for the module of FIG. 3, 4, or 5.
Figure 12:
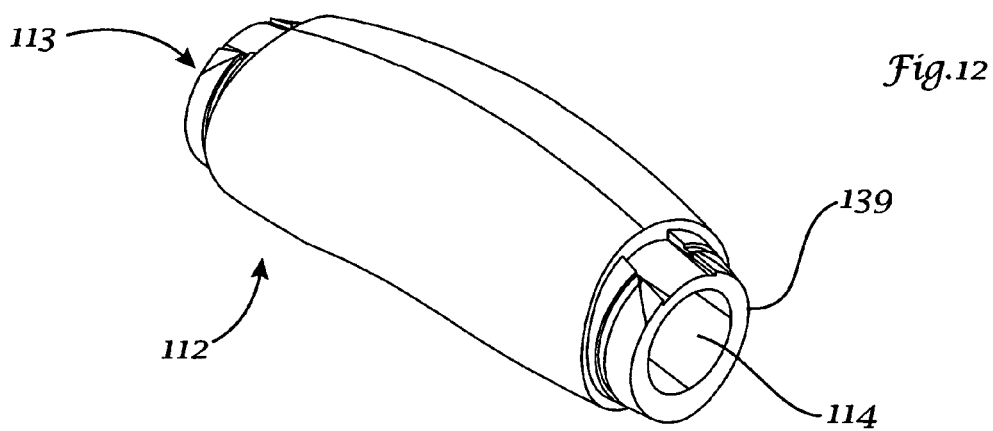
Figure 13:
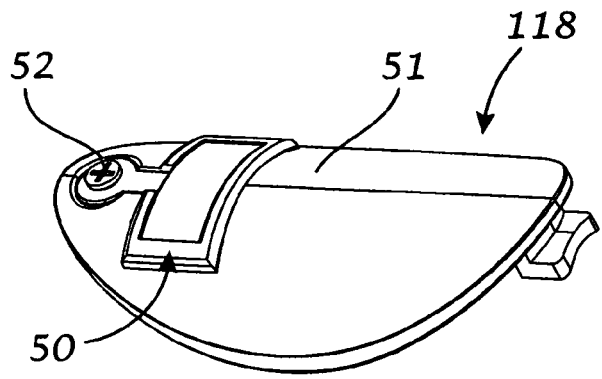
FIG. 13 is a top perspective view of an exemplary cover for the USB port access opening of the housing of FIGS. 11 & 12.
Figure 14:
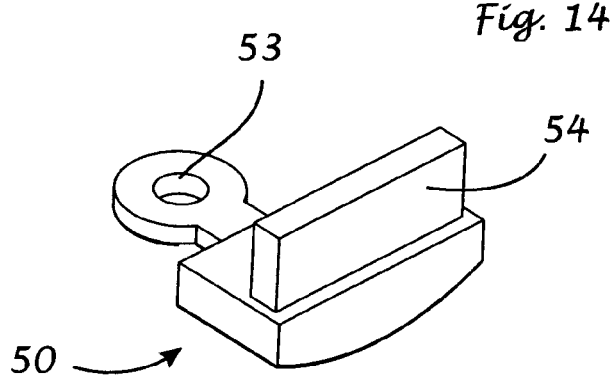
FIG. 14 is a bottom perspective view of the easily removable portion of the cover of FIG. 13.

The opening 37 (FIG. 7) allows access to the actuator 27 of the switch 26 of the module 16 to allow operation thereof. The opening 37 may be covered by an elastomeric material cap 17 (FIGS. 2 & 10), such as of TPR. The cap 17 may be removable, or glued or otherwise affixed in place. When the cap 17 is depressed, the actuator 27 of the switch 26 is actuated.

While it is sometimes preferred that the housing 12 be of hard plastic, if desired it can be made of flexible plastic, e. g. with a durometer of between about 40 and 80 on the Shore A scale. In that case the cover 17 is unnecessary since by simply pushing down on the part of the housing 12 overlying the actuator 27 of switch 26, the switch 26 operates the circuitry 28.

Figure 8:
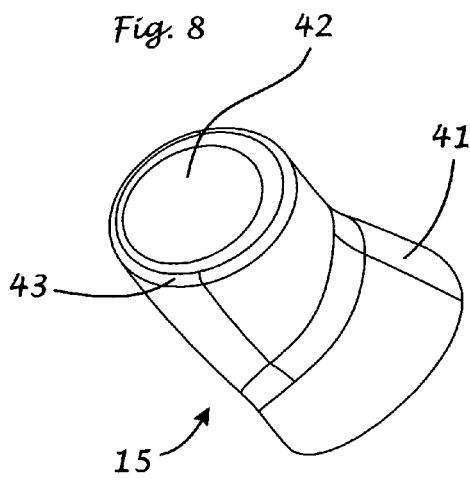
FIGS. 8 & 9 are perspective views of an exemplary end cap for the housing of FIGS. 6 & 7.
Figure 9:
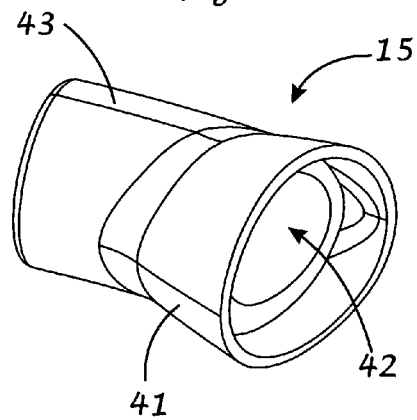

FIGS. 8 & 9 illustrate in more detail exemplary end caps 15 of FIGS. 1 & 2 that are preferably used with the housing 12 to properly position the element 11. The end caps 15 are preferably made of a soft, gripping, material such as silicone, TPU or TPR. Desirably the end caps 15 surround the element 11 near the ends 19, 20 thereof. The larger ends 41 of the end caps 15 (FIGS. 8 & 9) are affixed to the surfaces 39 and/or 40 (see FIGS. 6 & 7) of the housing 12, e. g. by a suitable adhesive, ultrasonic welding, over-molding, or in another conventional manner. The end caps 15 are not attached to the element 11, however, but merely surround it, so that the element 11 passes through the hollow interior 42 thereof, with the smaller ends 43 of the end caps 15 engaging and preferably gripping the exterior surface of the element 11. Thus the end caps 15 hold the element 11 ends 19, 20 securely enough in place that the device 10 functions properly, however the element 11 may be removed from the end caps 15, resized or otherwise acted upon, and re-inserted into gripping association with the end caps 15.

FIGS. 11-14 show a housing embodiment 112 that is also suitable for mounting either the module 116 with rechargeable battery 32, or the module 16. In this embodiment components comparable to those in FIGS. 1, 2, 6, 7 & 10 are shown by the same reference numeral only preceded by a "1." In this embodiment the housing 116 is made of flexible thermoplastic material (e. g. Shore A about 40-80) so that a cover like the cover 17 is not necessary since depression of the housing alone operates actuator 27 of switch 26.

Since housing 112 is of flexible material an opening for where the switch 26 is, is not necessary. An opening 136 (FIG. 11) is provided between the ends 113,114. The opening 136 allows access to the USB port 33 (FIG. 5) to recharge the battery 32, but could also be used to remove the module 116 (or 16). The opening 136 is covered by a cover 118 (FIG. 13) or the like which desirably is of hard plastic. The cover 118 can be releasably secured to the housing 112, especially if the module 16 is used, but if the module 116 is used preferably the cover 118 is substantially permanently secured to the housing 112, as by ultrasonic welding. The cover 118, however, desirably has a removable portion 50, held in place within the opening 51 in the cover 118 by a screw 52, or like removable fastener. The screw 52 goes through the opening 53 in the removable portion 50 (see FIG. 14) into screw threaded engagement with a screw-threaded opening (not shown) in the cover 118. A projection 54 on the removable portion 50 may help plug the top 55 (see FIG. 5) of the USB port 33.

FIG. 15 illustrates exemplary circuitry 28 that may be utilized in the PCB 22 of either of the modules 16, 116. The circuitry 28 includes an integrated circuit 60 having a first terminal 1 operatively connected to a first LED 23 through a resistor 61; a second terminal 2 operatively connected to a second LED 23 through a resistor 62; a third terminal 3 connected to the electrical switch 26; and two other terminals (5 and 6) connected to voltage from the at least one battery 24, 124 (terminal 5) and ground 63 (terminal 6), respectively, and operatively connected together with a capacitor 64. The capacitor 64 may be operatively connected to the LEDs 23 via a resistor 65.

In a preferred embodiment, the IC 60 of the circuitry 28 controls operation of the LEDs 23 to define different sequences of operation. In one particular preferred embodiment, when the switch 26 actuator 27 is pushed a first time both LEDs 23 flash quickly. When actuator 27 is pushed a second time, both LEDs 23 flash slowly. When actuator 27 is pushed a third time, both LEDs 27 remain continuously on. Finally, when actuator 27 is pushed a fourth time, both LEDs 23 are turned off.

In an exemplary manner of assembly of the device 10, the element 11 is cut to any suitable length desired. The module 16 is positioned within the housing 12, through opening 36, and may be fixed therein. The opening 36 is covered with cover 18. The opening 37 is covered by cover 17, which overlies actuator 27 of switch 26. The large ends 41 of the end caps 15 are connected to one or both of the surfaces 39, 40 of the housing 12, e. g. by adhesive. The ends 19, 20 of element 11 are passed through the hollow interiors 42 of the end caps 15 into the open ends 13, 14, respectively, of the housing 12 so that the smaller ends 41 of the end caps 15 hold the element 11 in place, cooperating with the housing 12 so that the ends 19, 20 are positioned immediately adjacent the LEDs 23, preferably essentially touching them.

While the above arrangement is definitely preferred, it is also possible that one or both of the ends 19, 20 may be fixed to the housing 12 either substantially permanently (e. g. with adhesive or ultrasonic welding), or releasably (e. g. with a relatively loose friction fit, clamp, or screw fastener).

Assume that the user places the open interior of the loop provided by the element 11 of the device 10 over her or his head so that it goes around his or her neck, so as to be used as a novelty or safety item. When it is desired to have the element transmit light, the cover 17 is depressed, which in turn depresses the actuator 27, closing the switch 26. Then the sequence described above with respect to the IC 60 is initiated, each depression of the actuator 27 resulting in a different mode of operation of the LEDs 23.

While the invention has been herein shown and described in what is presently conceived to be a practical and preferred embodiment thereof, it is to be understood that many modifications may be provided within the scope of the invention, which scope is to be accorded the broadest interpretation of the appended claims consistent with the prior art to encompass all equivalent structures and devices.

What is claimed is:
1. A light transmitting device comprising:
  a flexible elongated light transmitting element comprising high clarity translucent or transparent thermoplastic polymeric material having first and second ends;
  at least one LED;
  at least one battery for powering said LED; and at least one positioning element which positions the LED so that it is immediately adjacent but not embedded in said first end of said light transmitting element so that light is efficiently transmitting from said LED along said light transmitting element;

wherein said positioning element comprises a housing having first and second ends and operatively connected through flexible thermoplastic material end caps at said first and second ends thereof to said first and second ends, respectively, of said light transmitting element;

a printed circuit board including circuitry which operatively connects said LED to said battery, and an electrical switch in said circuitry which ultimately, through circuitry, connects or disconnects said LED to/from said battery;

wherein said printed circuit board mounts said LED, battery, and switch together in an integral module, and wherein said module is mounted in said housing; and wherein said housing is of hard plastic and has first and second openings formed therein between said first and second ends thereof, said first opening providing for ingress and egress of said module, and said second opening allowing access to said electrical switch for operation thereof.

2. A device as recited in claim 1 wherein said at least one LED comprises first and second LEDs, said first and second LEDs positioned immediately adjacent said first and second ends of said light transmitting element, respectively.

3. A device as recited in claim 2 wherein said first and second LEDs essentially touch said first and second ends, respectively, of said light transmitting element.

4. A device as recited in claim 3 wherein said at least one battery comprises a plurality of button batteries mounted face-to-face and engaging at opposite ends thereof metal battery holders also mounted by said printed circuit board, said LEDs on the opposite sides of said metal battery holders from said button batteries.

5. A device as recited in claim 3 wherein said at least one battery comprises a rechargeable battery; and further comprising a USB port mounted on said printed circuit board which allows recharging of said rechargeable battery.

6. A device as recited in claim 3 wherein said circuitry includes an integrated circuit having a first terminal connected to said first LED through a resistor, a second terminal connected to said second LED through a resistor, a third terminal connected to said electrical switch, and two other terminals connected to voltage from said at least one battery and ground, respectively, and operatively connected together with a capacitor.

7. A device as recited in claim 1 wherein said light transmitting element is of thermoplastic polyurethane.

8. A light transmitting device comprising:
a flexible elongated light transmitting element having first and second ends;
first and second LEDs, said first and second LEDs positioned immediately adjacent said first and second ends of said light transmitting element, respectively;
at least one rechargeable battery for powering said LEDs;
positioning elements which positions said LEDs so that they are immediately adjacent but not embedded in said first and second ends of said light transmitting element so that light is efficiently transmitting from said LEDs along said light transmitting element;

wherein said positioning elements comprise a housing having first and second ends and operatively connected through flexible thermoplastic material end caps at said first and second ends thereof to said first and second ends, respectively, of said light transmitting element;

a printed circuit board including circuitry which operatively connects said LEDs to said at least one battery, and an electrical switch in said circuitry which ultimately, through circuitry, connects or disconnects said LEDs to/from said at least one battery;

wherein said printed circuit board mounts said LEDs, at least one battery, and electrical switch together in an integral module;

wherein said first and second LEDs essentially touch said first and second ends, respectively, of said light transmitting element; and a USB port mounted on said printed circuit board which allows recharging of said rechargeable battery.

9. A device as recited in claim 8 wherein said flexible elongated light transmitting device comprises high clarity translucent or transparent thermoplastic polymeric material.

10. A device as recited in claim 9 wherein said light transmitting element is of thermoplastic polyurethane.

11. A device as recited in claim 8 wherein said housing is of hard plastic and has first and second openings formed therein between said first and second ends thereof, said first opening providing for ingress and egress of said module, and said second opening allowing access to said electrical switch for operation thereof.

12. A module comprising: at least one LED; at least one battery; a printed circuit board including circuitry which operatively connects said LED to said battery, and an electrical switch in said circuitry which ultimately, through circuitry, connects or disconnects said LED to/from said battery; said printed circuit board having first and second ends, and mounting said LED, battery, and switch together in an integral module with said LED at said first end thereof; and wherein said circuitry includes: an integrated circuit having a first terminal operatively connected to said first LED through a resistor; a second terminal operatively connected to said second LED through a resistor; a third terminal connected to said electrical switch; and two other terminals connected to voltage from said at least one battery and ground, respectively, and operatively connected together with a capacitor.

13. A module as recited in claim 12 wherein said at least one LED comprises first and second LEDs, said first and second LEDs mounted on said printed circuit board at said first and second ends, respectively, thereof.

14. A module as recited in claim 13 wherein said at least one battery comprises a plurality of button batteries mounted face-to-face and engaging at opposite ends thereof metal battery holders also mounted by said printed circuit board, said LEDs on the opposite sides of said metal battery holders from said button batteries.

15. A module as recited in claim 13 wherein said at least one battery comprises a rechargeable battery; and further comprising a USB port mounted on said printed circuit board which allows recharging of said rechargeable battery.

* * * * *